US009847957B2

(12) United States Patent
Baldwin

(10) Patent No.: US 9,847,957 B2
(45) Date of Patent: *Dec. 19, 2017

(54) METHOD, SYSTEM, AND COMPUTER READABLE STORAGE DEVICE FOR MANAGING MESSAGE DELIVERY BASED ON CONTEXT OF RECIPIENTS AND MESSAGE CONTENT

(71) Applicant: AT&T Intellectual Property I, L.P., Atlanta, GA (US)

(72) Inventor: Christopher Baldwin, Algonquin, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,901

(22) Filed: Jan. 4, 2017

(65) Prior Publication Data
US 2017/0118153 A1  Apr. 27, 2017

Related U.S. Application Data

(63) Continuation of application No. 13/714,623, filed on Dec. 14, 2012, now Pat. No. 9,565,150.

(51) Int. Cl.
*G06F 15/177* (2006.01)
*H04L 12/58* (2006.01)

(52) U.S. Cl.
CPC ............ *H04L 51/12* (2013.01); *H04L 51/063* (2013.01); *H04L 51/34* (2013.01)

(58) Field of Classification Search
USPC ............ 709/220, 206, 223; 455/446, 412.1; 707/803, 748
See application file for complete search history.

(56) References Cited

U.S. PATENT DOCUMENTS 5,493,692 A * 2/1996 Theimer .............. G06Q 10/107
340/5.74
8,856,075 B2 * 10/2014 Rathod ............ G06F 17/30867
705/14.49

(Continued)

OTHER PUBLICATIONS

Gwizdka, Jacek "What's in the Context?", CHI 2000 Workshop 11 (2000).

(Continued)

*Primary Examiner* — Tammy Nguyen
(74) *Attorney, Agent, or Firm* — Garlick & Markison; Bruce E. Stuckman; Randy W. Lacasse

(57) ABSTRACT

Message delivery is controlled based on the context of multiple recipients and the content of one or more messages. One or more messages are received from one or more sender devices, the messages containing dynamic content. Contextual requirement data is received from the sender device(s) indicating a dynamic contextual requirement to be met for the message(s) to be made available to a user of one or more recipient devices. Context data is received, indicating a context of each user of a respective recipient device. The dynamic content and the dynamic contextual requirements are modifiable, depending on the context data. The context data is evaluated to determine whether the dynamic contextual requirement is met. Responsive to the dynamic contextual requirements being met, a respective message is made available to a respective user of the recipient devices.

17 Claims, 7 Drawing Sheets

(56) References Cited

U.S. PATENT DOCUMENTS

| | | | |
|---|---|---|---|
| 9,270,701 B1* | 2/2016 | Lamb | H04L 63/20 |
| 2004/0030753 A1* | 2/2004 | Horvitz | G05B 19/404 |
| | | | 709/206 |
| 2007/0214245 A1* | 9/2007 | Hamalainen | H04L 12/1859 |
| | | | 709/223 |
| 2007/0232274 A1* | 10/2007 | Jung | H04M 1/72552 |
| | | | 455/412.1 |
| 2007/0265814 A1 | 11/2007 | Moore et al. | |
| 2009/0099992 A1 | 4/2009 | Horvitz | |
| 2009/0186635 A1* | 7/2009 | Vieri | G06Q 30/0241 |
| | | | 455/466 |
| 2010/0138452 A1* | 6/2010 | Henkin | G06Q 30/0256 |
| | | | 707/803 |
| 2010/0262477 A1 | 10/2010 | Hillerbrand et al. | |
| 2012/0023109 A1* | 1/2012 | Sternemann | G06F 17/30592 |
| | | | 707/748 |
| 2013/0124189 A1 | 5/2013 | Baldwin | |
| 2014/0172988 A1 | 6/2014 | Baldwin | |
| 2014/0181633 A1 | 6/2014 | Mo et al. | |

OTHER PUBLICATIONS

Knox et al. "Towards Scatterbox: a Context-Aware Message Forwarding Platform", Systems Research Group, School of Computer Science and Informatics; Dublin, Ireland.
Kolari, Juha "Kontti • Context-aware Mobile Portal", www.ercim.eu/publicalion/Ercim_news/enw54/kolari.hlml (Jul. 2003).
Norrie el al. "Empowering Databases for Context-Dependent Information Delivery", Inslitute for Information Systems; Zurich, Switzerland.

* cited by examiner

METHOD, SYSTEM, AND COMPUTER READABLE STORAGE DEVICE FOR MANAGING MESSAGE DELIVERY BASED ON CONTEXT OF RECIPIENTS AND MESSAGE CONTENT

CROSS-REFERENCE TO RELATED APPLICATIONS

The present U.S. Utility patent application claims priority pursuant to 35 U.S.C. §120 as a continuation of U.S. Utility application Ser. No. 13/714,623entitled "Method, System, and Computer Readable Storage Device for Managing Message Delivery Based on Context of a Recipient and Message Content," filed Dec. 14, 2012, which is hereby incorporated herein by reference in its entirety and made part of the present U.S. Utility patent application for all purposes.

TECHNICAL FIELD

The present disclosure relates generally to telecommunications, and, more particularly, to managing message delivery.

BACKGROUND

Smartphones have shifted how people prefer to communicate. Instead of using voice calls to communicate, more and more people prefer to use messages to communicate. The transition from voice communication to messaging presents problems in terms of context, as messaging allows conversations to take place over minutes, hours, days, or even longer periods. Over time, the intent of a message and the circumstances or context in which the message was sent may be lost.

Though the sender likely knows the appropriate context or circumstances in which a message should be read by a recipient, once a message is sent from a device, such as a smartphone, the sender has virtually no control over the circumstances in which the message is viewed. The sender's lack of control over changing context and circumstances of the recipient presents issues not only with messages being misunderstood but also contributes to messages being sent that might be untimely.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the claimed subject matter.

According to an exemplary embodiment, a method is provided for controlling message delivery. A message is received from a sender device, the message containing dynamic content. Contextual requirement data is received from the sender device indicating a dynamic contextual requirement to be met for the message to be made available to a user of a recipient device. Context data is received, indicating a context of the user of the recipient device. The dynamic content and the dynamic contextual requirement are modifiable, depending on the context data. The context data is evaluated to determine whether the dynamic contextual requirement is met. Responsive to the dynamic contextual requirement being met, the message is made available to the user of the recipient device.

According to another embodiment, a system for managing message delivery is provided. The system includes a processor and a memory. The memory contains computer-readable instructions which, when executed by the processor, cause the processor to perform operations. The operations comprise receiving a message from a sender device, the message containing dynamic content, receiving contextual requirement data from the sender device indicating a dynamic contextual requirement to be met for the message to be made available to a user of a recipient device, and receiving context data indicating a context of the user of the recipient device. The dynamic content and the dynamic contextual requirement are modifiable, depending on the context data. The operations further comprise evaluating the context data to determine whether the dynamic contextual requirement is met, and, responsive to the dynamic contextual requirement being met, making the message available to the user of the recipient device.

According to another embodiment, a computer-readable storage device has instructions recorded thereon which, when executed by a processor, cause the processor to perform operations for controlling message delivery. The operations comprise receiving a message from a sender device, the message containing dynamic content, receiving contextual requirement data from the sender device indicating a dynamic contextual requirement to be met for the message to be made available to a user of a recipient device, and receiving context data indicating a context of the user of the recipient device. The dynamic content and the dynamic contextual requirement are modifiable, depending on the context data. The instructions further comprise evaluating the context data to determine whether the dynamic contextual requirement is met, and, responsive to the dynamic contextual requirement being met, making the message available to the user of the recipient device.

DETAILED DESCRIPTION

Detailed exemplary embodiments are disclosed herein. It must be understood that the embodiments described and illustrated are merely examples that may be embodied in various and alternative forms, and combinations thereof. As used herein, the word "exemplary" is used expansively to refer to embodiments that serve as examples or illustrations. The figures are not necessarily to scale and some features may be exaggerated or minimized to show details of particular components. Specific structural and functional details disclosed herein are not to be interpreted as limiting.

It should be understood that FIGS. 1-7 and the following description are intended to provide a brief, general description of a suitable environment in which the various aspects of some embodiments of the present disclosure can be implemented. While the description includes a general context of computer executable instructions, the present disclosure can also be implemented in combination with other program modules and/or as a combination of hardware and software. The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like.

According to exemplary embodiments, a sender is given greater control over the delivery of a message. The delivery of a message may be controlled based on the changing conditions, circumstances, or context of the sender and/or the recipient. For the purposes of this disclosure, the terms "conditions", "circumstances", and "context" may be used interchangeably. Also, the term "sender" may include the user actually sending a message via a sender device and/or the sender device. Similarly, the term "recipient" may include an authorized user actually being presented with a message via a recipient device and/or the recipient device.

In addition to the sender being given greater control over message delivery based on changing circumstances, according to exemplary embodiments, the sender is also given control over the content of the message as the context of the sender/recipient changes. Generally, message recipients are not aware of the contents of a message. If the recipient was aware of message content, there would be no need to read it and in many cases no need for it to have been sent. If a recipient receives a message, the contents of which he or she has no prior knowledge, then of the two parties involved (sender and recipient) the sender knows more about the circumstances in which the message should be viewed and how the content of the message may need to be changed, depending on the changing circumstances of the sender/recipient.

Figure 1:
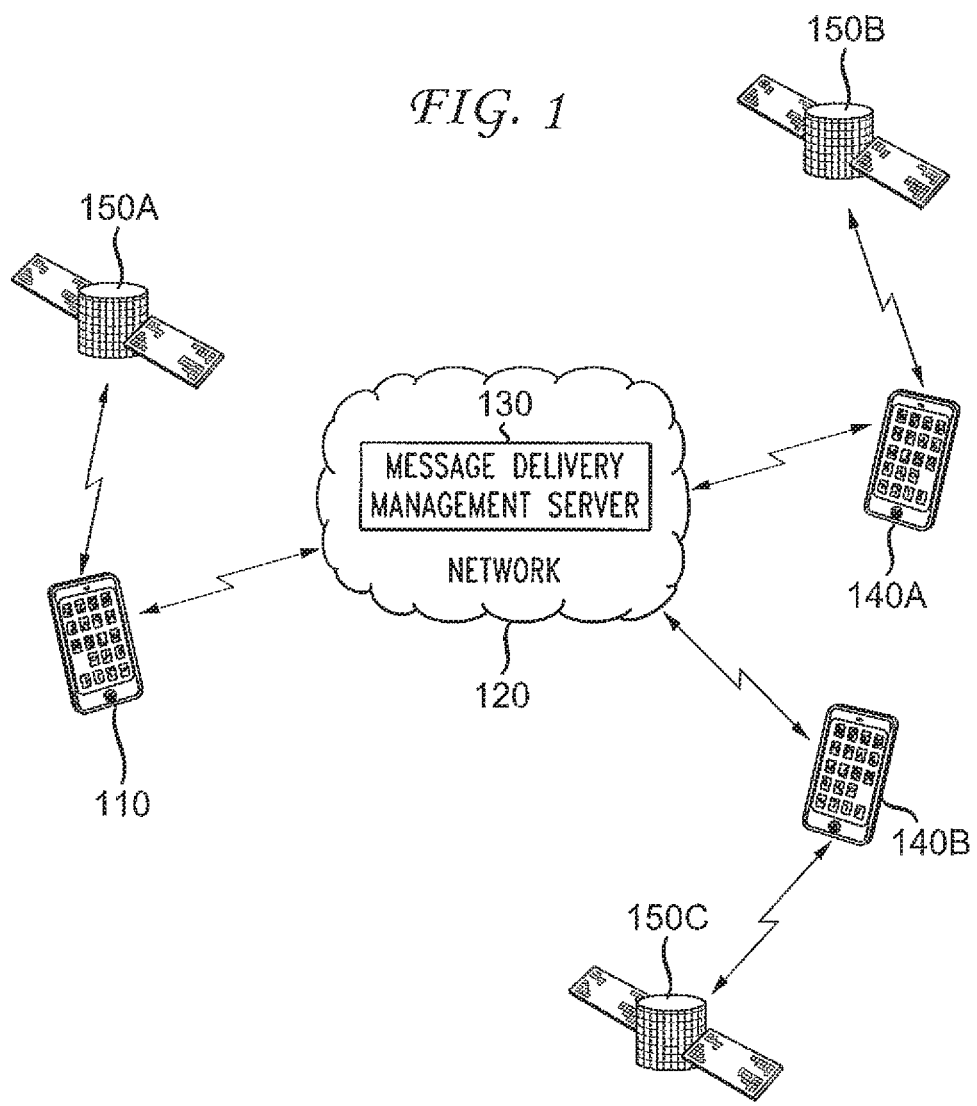
FIG. 1 illustrates an exemplary environment in which message delivery may be managed according to an exemplary embodiment.

FIG. 1 illustrates an exemplary system for managing message delivery according to an exemplary embodiment. In the system shown in FIG. 1, a sender device 110 communicates with one or more recipient devices 140A and 140B via a cloud-based network 120. According to one embodiment, a message delivery management server 130, that is may be part of the network 120, may participate in the communications between the sender device 110 and the recipient devices 140A and 140B and may be involved in controlling message delivery.

The information communicated by the sender device 110 includes one or more messages initiated, e.g., by a sender, and intended for authorized users of one or more of the recipient devices 140A and 140B. The messages may include messages such as, but not limited to: Short Message Services (SMS), Multimedia Messaging Service (MMS), electronic mail (email), Smart Messaging, and Extended Message Service (EMS).

The information communicated by the sender device 110 also includes contextual requirement data indicating under what conditions a message should be made available to users of the recipient devices 140A and 140B, e.g., what the context of the recipient and/or the recipient device should be before the message is made available to users of the recipient devices. For the purposes of this disclosure, the terminology "made available to a user of the recipient device" may be understood to mean that a message is delivered to a recipient device and that the message is made accessible to be read or heard by an authorized user of the recipient device.

According to one embodiment, contextual requirements may be determined by the sender, who may dictate the context or circumstances under which the message should be made available to a recipient. Contextual requirements may indicate various contexts of the recipient under which messages should be made available to a user of a recipient device, e.g., location, activity, state of mind/emotional state, time of day, day of the year, environment, proximity to people or places, scheduled/planned events activities (past or present), recipient generated data (such as voice calls, data sessions, profile information, patterns of recipient, etc.). Also, the contextual requirements may indicate various contexts of the sender and/or the sender device under which messages should be made available to a user of a recipient device. Such sender contexts may include context data similar to the recipient/recipient device context, e.g., location, activity, state of mind/emotional state, time of day, day of the year, environment, proximity to people or places, scheduled/planned events activities (past or present), etc.

All or part of the contextual requirements may be input manually by the sender or generated by the sender device 110, a cloud network based agent, etc. The entity which generates contextual requirements may depend, in part on the sender's circumstances when sending the message, e.g., the sender's capability to enter contextual requirements at a given time.

Since context or circumstances change, according to exemplary embodiments, the contextual requirements are modifiable up until the time the message is made available to the user of the recipient device. This means that should something change prior to the contextual requirements being met, the contextual requirements can be modified. To that end, the sender may actively monitor delivery/reading of messages or may be notified whether a message is read or not, so that the sender may be made aware whether the opportunity for modifying contextual requirements exists. As an alternative, the sender may simply attempt to modify contextual requirements associated with delivery of a message at any point, and the contextual requirements will be modified unless the message has already been made available to the recipient.

The messages and/or contextual requirement data may be communicated from the sender device 110 to the message delivery management server 130, which may store such information for later evaluation, as described below. If the messages and contextual requirement data are stored in the message delivery management server 130, the message delivery management server 130 may notify the recipient devices 140A and 140B that a context-dependent message is waiting for them. In response to the notification, the recipient devices 140A, 140B may begin streaming or periodically sending context data to the message delivery management server 130. When the message delivery management server 130 determines that the contextual requirements have been satisfied, the messages may be sent to the recipient devices 140A, 140B.

Alternatively, the sender device 110 may store some of this information, e.g., the messages, and communicate the contextual requirements to the message delivery management server 130. As yet another alternative, the messages and contextual requirement data may be stored by the sender device 110 until a determination is made that a message should be made available to one or more recipients via recipient devices 140A and 140B. In either case, the sender device 110 may automatically send the message once the contextual requirements are met, or the sender may be prompted to send the message or cancel it.

As yet another alternative, the messages and contextual requirements may be delivered via the network 120 to the recipient devices 140A and 140B, which may store such information until determining that the messages should be made available to users of the recipient devices.

As another alternative, the contextual requirements may be transmitted to the recipient devices 140A, 140B, but the messages may remain in the sender device 110 and/or the message delivery management system 130. The recipient devices 140A, 140B may evaluate the contextual requirements and send data indicating that such requirements have been met to the message delivery management server 130 and/or the sender device 110 via the network 120. The messages may then be sent to the recipient devices 140A, 140B to be made available to users of the recipient devices 140A, 140B.

According to exemplary embodiments, storage of messages and contextual requirements at the sender device versus the message delivery management server 130 or the recipient devices 140A and 140B may be determined, for example, by the sender, the sender device 110, the message delivery management server 130, and/or the recipient devices 140A, 140B, based, e.g., on available memory of the sender device 110 and/or the recipient devices 140A, 140B.

Also, the choice of where to store messages and contextual requirements may depend on what devices are connected to the network. For example, if the recipient devices 140A, 140B are connected to the network 120, the messages and/or contextual requirement data may be automatically communicated to and stored in the recipient devices 140A, 140B. If the recipient devices are not connected to the network 120, such information may be held in the sender device 110 and/or the message delivery management server 130 until the recipient devices 140A, 140B are connected. As yet another alternative, the messages and/or contextual requirement data may be stored in the sender device 110 or the message management delivery server 130 regardless of whether or not the recipient devices 140A, 140B are connected.

According to yet another embodiment, there may be duplicate storage of messages and contextual requirements in the sender device 110, the message delivery management server 130, and/or the recipient devices 140A, 140B for the sake redundancy, e.g., in case the sender device 110 is lost or the message delivery management server 130 needs maintenance.

Information communicated by the recipient devices 140A and 140B, e.g., to the message delivery management server 130 and/or the sender device 110, may include the context data indicating the context of a user of a recipient device and/or the context of the recipient device. Such context data may include location data, calendar data, time of day, state of mind of a recipient, etc. The location information may be obtained via a location system including, e.g., GPS satellites 150B and 150C. The location information may correspond to the location of the recipient devices 140A and 140B, respectively.

As noted above, context data may also be collected for the sender/sender device 110. Such context data may include context data similar to that collected for the recipient/recipient device, e.g., location data, calendar data, time of day, state of mind of a recipient, etc. The location information may be obtained via a location system including, e.g., GPS satellite 150A. The location information may correspond to the location of the sender device 110.

Context data for the sender and/or the recipient may also include information input by users of the sender device 110 and/or the recipient devices 140A, 140B via a keypad, touchscreen, etc., as described with reference to FIG. 2. The information may relate, e.g., to a state of mind of the user of the sender/recipient device, etc. In addition, context data may also include audio and/or video data which may be recorded by a camera/microphone or data from a sensor located within or external to the sender device 110 and recipient devices 140A and 140B, e.g., a surveillance camera in an environment such as a retail establishment, a thermometer in proximity to the sender/recipient and/or the sender/recipient devices, etc. Also, context data regarding the sender/recipients may be obtained from a cloud network based user tracking system which tracks user generated data (such as voice calls, data sessions, profile information, patterns of use, etc.) to improve context determination. Such a cloud based system may obtain additional contextual data from sources other than the sender and recipient devices, e.g., satellites, sensors, etc. This cloud based system may be part of the network 120 or may communicate with the network 120. An example of such a cloud-based system, which may infer information regarding the context of the recipients, is described in co-pending U.S. patent application Ser. No. 13/293,417, filed in November 2011, and herein incorporated by reference. Thus, according to exemplary embodiments, context data of the sender/recipients may be received from several sources, not just the sender device 110 and the recipient devices 140A and 140B.

The context data of the recipient/recipient devices may be communicated to the message delivery management server 130, via the network 120, for evaluation. Alternatively, the context data of the recipient/recipient devices may be delivered to the sender device 110 or may be delivered to and/or held in the recipient devices 140A and 140B for evaluation.

Similarly, the context data of the sender/sender devices may be communicated to the message delivery management server 130, via the network 120, for evaluation. Alternatively, the context data of the sender/sender device may be delivered to the recipient devices 140A, 140B or may be delivered to and/or held in the sender device 110 for evaluation.

According to an exemplary embodiment, context data may be categorized as brief or sustained. For example, if a user of a recipient device or a sender device is sitting in a cafe, the context data may be considered to be sustained, as it will not be expected to change over a certain amount of time, e.g., several minutes. If the user of the recipient device or the sender device is traveling through a small town, the context may be considered to be brief, as it will be expected to change over a short amount of time, e.g., a few minutes. The categorization of context data as sustained or brief may be based on the location information of the sender device 110 and recipient devices 140A, 140B received from, e.g., satellites 150A, 150B, and 150C, over an amount of time which may be set by the sender and/or predetermined, e.g., by the sender device 110. This categorization of context data as brief or sustained may become part of the context data taken into consideration in evaluating whether contextual requirements are met.

Context information of the recipient/recipient devices 140A, 140B and the sender/sender device 110 is evaluated to determine whether the requirements for making a message available to one or more users of the recipient devices are met. This evaluation may occur at the recipient devices 140A and 140B, the message delivery management server 130 or the sender device 110. If evaluation of the context data occurs at the message delivery management server 130, the context data is communicated to the message delivery management server 130 via, e.g., the network 120. If the evaluation of the context data occurs at the sender device 110, the context data is communicated to the sender device 110 via, e.g., the network 120. If the evaluation of the context data occurs at the recipient device, the context information is communicated to the recipient device 140A, 140B via, e.g., the network 120.

One advantage of having the messages stored and evaluated outside of the recipient devices 140A, 140B is to conserve the memory of the recipient devices 140A, 140B. Another advantage is to provide greater security. If the messages are delivered to the recipient devices 140A and 140B, even though they may be encrypted, there is a potential for the encryption being hacked. Storing the messages outside the recipient devices 140A and 140B and performing evaluation of the contextual requirements outside the recipient devices 140A and 140B minimizes the risk of having the message data hacked.

According to exemplary embodiments, the sender device 110 may be implemented as a cellular mobile communication device, such as the device 200 described in detail below with reference to FIG. 2. Similarly, the recipient devices 140A and 140B may be implemented as mobile communication devices, such as the device 200. Alternatively, one or more of the communication devices 110, 140A and 140B may be implemented with a personal computing device or other communication device.

Although one sender device 110 and two recipient devices 140A and 140B are shown in FIG. 1 for illustrative purposes, it should be appreciated that any number of communication devices may exchange information in the manner set forth in this disclosure. Moreover, although three GPS satellites 150A, 150B, and 150C are illustrated, any number of location devices and other types of location systems may be used.

The message delivery management server 130 may be implemented with a device, such as the device 300 described in further detail below with reference to FIG. 3. Also, a device such as that shown in FIG. 3 may be included in one or more of the communication devices 110, 140A, 140B (depending the device in which evaluation of the contextual requirements occurs).

As explained above, the network 120 may include a cloud-based network. The cloud-based network may include a wireless Internet network including multiple networks and servers, a wired Internet network, or a combination of both. According to an exemplary embodiment, the network 120 may be implemented with one or more wireless networks that use exemplary telecommunications standards, such as Global System for Mobile communications (GSM) and Universal Mobile Telecommunications Systems (UMTS). It should be understood, however, that the embodiments may be implemented in wireless networks that use any existing or yet to be developed telecommunications technology. Some examples of other suitable telecommunication technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to General Packet Radio Service (GPRS), Enhanced Data rates for Global Evolution (EDGE), High-Speed Packet Access (HSDPA) protocol family, such as High-Speed Downlink Packet Access (HSDPA), Enhanced Uplink (EUL) or otherwise termed High-Speed Uplink Packet Access (HSUPA), Evolved HSPA (HSPA+) and various other current and future data bearers.

As described above with reference to FIG. 1, according to an exemplary embodiment, a sender is allowed to modify contextual requirements and/or message content, regardless of where the message is stored and which system is evaluating the contextual requirements. If the contextual requirements are not all satisfied, the sender may be allowed to modify the contextual requirements and/or the message content.

According to exemplary embodiments, the sender of a message is allowed to assert some level of control over the circumstances in which the recipient may receive and view a message. The dependence on contextual requirements being met for the message to be made available to a recipient enables new types of messages to be sent. These new types of message may be considered "If, Then" type messages in so much as "If" a condition is satisfied, "Then" the message is made available to one or more recipients. This may be further understood with reference to FIG. 4 below.

By providing the sender with control to dictate and modify contextual requirements, messaging no longer needs to be viewed as a linear communication with messages being delivered in the order they are sent. Rather, the order in which messages are made available and to the recipients to which messages are made available may be controlled based on dynamic contextual requirements. As a simple example, the sender may specify contextual requirements that indicate that a message B should be received and read by a recipient before message A, though message A is sent first, followed by message B. This may be further understood with reference to FIG. 5 below. Additional examples of enhanced context-dependent messaging are provided and may be understood with reference to FIGS. 6-7 below.

In addition to allowing a sender to dictate and modify the contextual requirements for making a message available to a recipient, according to an exemplary embodiment, the content of a message may change based on the contextual requirements. Such modification of context may be performed, e.g., by a processor, in the sender device 110, the message delivery management server 130, or the recipient devices 140A and 140B. As an illustrative example, consider a message sent by the sender device 110 at 1 pm that reads "Meet me in 30 minutes in the park". If the contextual requirements for making the message available to the recipient are not met until 1:20 pm, and the recipient does not read the message until then, the recipient would need to decide whether the sender intends to meet at 1:50 pm or whether the sender intends to meet at 30 minutes from the time the message was sent (in which case the recipient would need to identify the time at which the message was sent and then calculate the intended meeting time as 1:30 pm). To alleviate this guesswork on the part of the recipient, the sender may indicate that message content be automatically changed to update the minutes until meeting based on the context of the recipient. In this case, the sender device 110, the message delivery management server 130, or the recipient device 140A, 140B, may automatically change the context of the message to read "Meet me in 10 minutes in the park" upon the contextual requirements for delivering the message being met but before making the message available to the recipient. Alternatively, the sender may indicate that the time for meeting be automatically changed based on the context of the recipient. In this case, the message content may be modified to read "Meet me in the park at 1:50 pm", depending on the sender's preferences. As yet another alternative, the sender may indicate that if the contextual requirements are not met by a certain time, e.g., 2:00 pm, the message should be canceled and/or the message content be automatically changed to "Let me know when you would like to meet me in the park".

Figure 2:
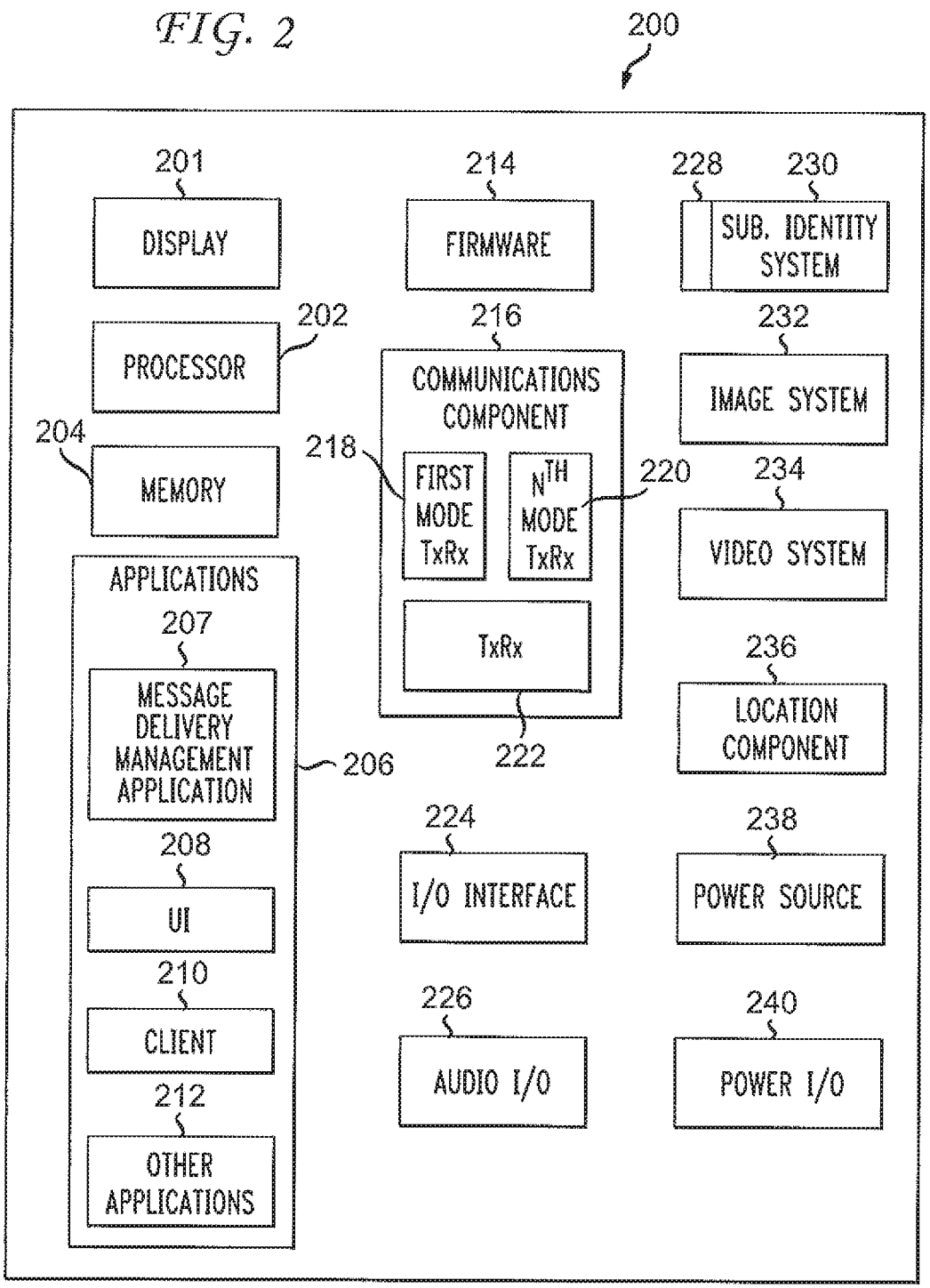
FIG. 2 illustrates a communication device according to an exemplary embodiment.

FIG. 2 illustrates a schematic block diagram of an exemplary device 200 with which the devices 110, 140A and 140B may be implemented, according to an exemplary embodiment. Although no connections are shown between the components illustrated in FIG. 2, those skilled in the art will appreciate that the components can interact with each other via any suitable connections to carry out device functions. Referring to FIG. 2, the device 200 may be a multimode handset and can include a variety of computer-readable media, including volatile media, non-volatile media, removable media, and non-removable media. The term "computer-readable media" and variants thereof, as used in the specification and claims, can include storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed by the device 200.

The device 200 may include a display 201 for displaying multimedia, such as, for example, text, images, video, and telephone functions, such as Caller ID data, setup functions, menus, music metadata, messages, wallpaper, graphics, Internet content, device status, preference settings, and the like.

The device 200 may include a processor 202 for controlling and/or processing data. A memory 204 can interface with the processor 202 for the storage of data and/or applications 206. For example, the memory may store messages from the sender intended for one or more recipients. Also, the memory may store context data of a user of the device 200 and/or the device, itself, as well as contextual requirement data for making a message available to a recipient.

The applications 206 may include, for example, SMS messaging software, EMS message software, MMS messaging software, USSD software, a WAP browser, and the like. Also, according to an exemplary embodiment, the applications 206 may include a message delivery management application 207 for use evaluating context data, modifying message content and contextual requirements, and controlling delivery of messages based on message content, contextual requirements, and sender/recipient context.

The applications 206 may also include a user interface (UI) application 208. The UI application 208 can interact with a client 210 (e.g., an operating system) to facilitate user interaction with device functionality and data, for example, entering and modifying message content and contextual requirements, viewing received messages, answering/initiating calls, entering/deleting data, password entry and settings, configuring settings, address book manipulation, and the like. Such user interaction may be facilitated via, e.g., a keypad or a touchscreen included in the device 200 or communicating with the device via the I/O interface 224. Also, according to exemplary embodiments, the UI application 208 can be used for entering context data, e.g., data regarding a user's current state of mind, planned activities of the user, etc.

The applications 206 may include other applications 212, such as, for example, add-ons, plug-ins, email applications, music application, video applications, camera applications, location-based service (LSB) applications, power conservation applications, game applications, productivity application, entertainment applications, combinations thereof, and the like, as well as subsystem and/or components.

The applications 206 can be stored in the memory and/or in firmware components 214 and can be executed by the processor 202. The firmware 214 can also store code for execution during initialization of the device 200.

A communications component 216 may interface with the processor 202 to facilitate wired/wireless communication with external systems including, for example, the network 120, cellular networks, location systems, VoIP networks, local area networks (LAN's), wide area networks (WAN's), metropolitan area networks (MAN's), personal area networks (PAN's), and other networks, which may be implemented using WIFI, WIMAX, combinations and improvements thereof, and the like. The communications component 216 can also include a multimode communication subsystem for providing cellular communications via different cellular technologies. For example, a first cellular transceiver 218 can operate in one mode, for example, GSM, and an Nth transceiver 220 can operate in a different mode, for example UMTS. While only two transceivers 218, 220 are illustrated, it should be appreciated that a plurality of transceivers may be included. The communications component 216 may also include a transceiver 222 for other communication technologies, such as, for example, WIFI, WIMAX, BLUETOOTH, infrared, IRDA, NFC, RF, and the like. The communications components 216 may also facilitate reception from terrestrial radio networks, digital satellite radio networks; Internet based radio service networks, combinations thereof, and the like. The communications component 216 can process data from a network, such as, for example, the network 120, the Internet, a corporate network, a home broadband network, a WIFI hotspot, and the like via an ISP, DSL provider, or broadband provider. The communications component 216 can be used to communicate message content, contextual requirements, and context data.

An input/output (I/O) interface 224 may be provided for input/output of data and/or signals. The I/O interface 224 may be a hardwire connection, such as, for example, a USB, mini-USB, audio jack, PS2, IEEE 1394, serial, parallel, Ethernet (RJ48), RJ11, and the like, and can accept other I/O devices such as, for example, keyboards, keypads, mice, interface tethers, stylus pens, printers, thumb drives, touch screens, multi-touch screens, touch pads, trackballs, joysticks, microphones, remote control devices, monitors, displays and liquid crystal displays (LCDs), combination thereof, and the like. Messages, contextual requirements, and context data may be input and modified via such devices. It should be appreciated that the I/O interface 224 can be used for communication between the device and a network or local device instead of, or in addition to, the communications component 216.

Audio capabilities may be provided by an audio I/O component 226 that may include a speaker for the output of audio signals and a microphone to collect audio signals. The device 200 can include a slot interface 228 for accommodating a subscriber identity system 230 such as, for example, a subscriber identity module (SIM) or universal SIM (USIM). The subscriber identity system 230 instead can be manufactured into the device 200, thereby obviating the need for a slot interface 228. In some embodiments, the subscriber identity system 230 can store certain features, user characteristics, rules, policies, models, contact information, and the like. The subscriber identity system 230 can be programmed by a manufacturer, a retailer, a user, a computer, a network operator, and the like.

The device 200 can further include an image capture and processing system 232 (image system). Photos and/or videos can be obtained via an associated image capture subsystem of the image system 232, for example, a camera. The device 200 may also include a video system 234 for capturing, processing, recording, modifying, and or transmitting video content. The photos/video may become part of message content intended for a recipient and/or the context data for the device 200.

A location component 236 may be included to send and/or receive signals such as, for example, GPS data, A-GPS data, WIF/WIMAX and or cellular network triangulation data, combinations thereof, and the like. The location component 236 can interface with cellular network nodes, telephone lines, satellites (such as satellites 150A, 150B, and 150C), location transmitters and/or beacons, wireless network transmitters and receivers, for example, WIFI hotspots, radio transmitters, combinations thereof and the like. The device 200 may obtain, generate, and/or receive data to identify its location or can transmit data used by other devices to determine the device location. The location of the device 200 can be stored locally in the device 200 and/or provided to the message delivery management server 130 as context data. A determination as to whether the context data is sustained or brief may be made, based on how quickly the location data of the device 200 changes over time. This determination may be made by the processor 202 (either in the sender device or in the recipient device) and/or by the message delivery management server 130.

The device 210 may also include a power source 238, such as batteries and/or other power subsystems (AC or DC). The power source 238 can interface with an exemplary power system or charging equipment via a power I/O component 240.

Although not shown in the interest of simplicity of illustration, the device 200 may include additional inputs and sensors for detecting a context of the device 200, such as a thermometer, a barometer, etc.

Figure 3:
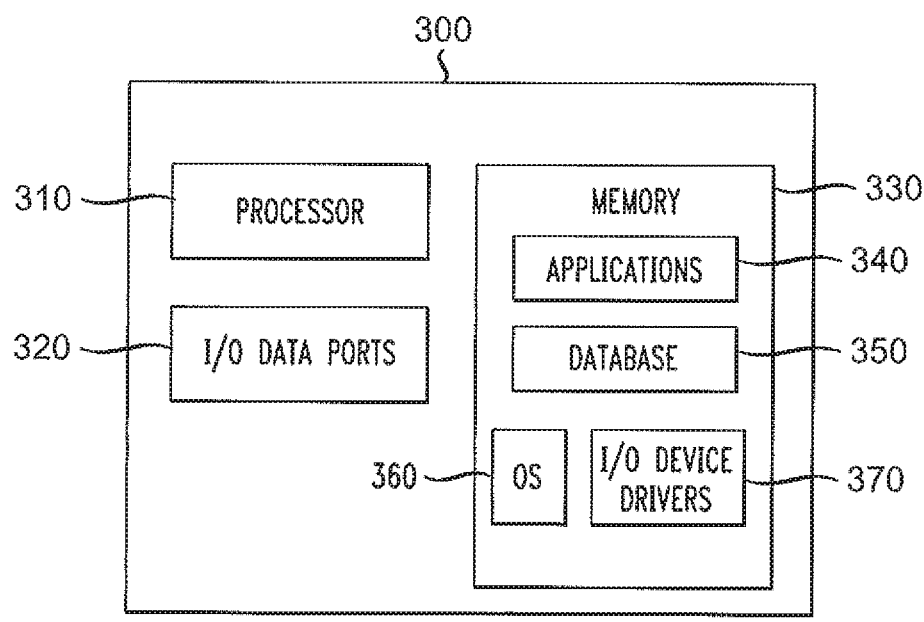
FIG. 3 illustrates a block diagram of a system for managing delivery of a message according to an exemplary embodiment.

FIG. 3 is a block diagram of a device for managing delivery of a message according to an exemplary embodiment. The device 300 may be implemented at the sender device 110, the message management delivery server 130, and/or the recipient device(s) 140A and 140B. For simplicity of explanation, the device 300 will be described as being implemented in the message delivery management server 300. However, it should be appreciated, that the functions of the components of the device 300 described below may be similarly performed by components of the devices 110, 140A and 140B, including but not limited to the processor 202, the memory 204, and the message delivery management server application 207.

The device 300 includes a processor 310 that receives information, such as contextual requirements from the sender device 110, context data from the recipient/sender devices 110, 140A and 140B and other sources, and message content from the sender device 110 via I/O Data Ports 320. The I/O Data Ports 320 can be implemented with, e.g., an interface including an antenna or other suitable type of transceiver through which data and signals may be transmitted and received. It should be appreciated that the I/O Data Ports 320 can be used for communications with the sender device 110 and the recipient devices 140A and 140B via the network 120. Thus, in addition to any data that may be stored in the database 350 in the memory 330, such as pre-stored message content and contextual requirements, the processor 310 may also receive other information that may be relevant to message delivery management, e.g., context data from the sender device 110, the recipient devices 140A and 140B and other sources and modified message content and/or contextual requirements from the sender device 110.

The processor 310 communicates with the memory 330 via, e.g., an address/data bus. The processor 310 can be any commercially available or customer microprocessor. The memory is 330 is representative of the overall hierarchy of memory devices containing the software and data used to implement the functionality of the device 300. The memory 330 can include but is not limited to the following types of devices: processor registers, processor cache, RAM, ROM, PROM, EPROM, EEPROM, flash memory, SRAMD, DRAM other volatile memory forms, and non-volatile, semi-permanent or permanent memory types, for example, tape-based media, optical media, solid state media, hard disks, combinations thereof, and the like.

As shown in FIG. 3, the memory 330 may include several categories of software and data used in the device 300, including, applications 340, a database 350, an operating system (OS) 360, and the input/output (I/O) device drivers 370. As will be appreciated by those skilled in the art, the OS 360 may be any operating system for use with a data processing system. The I/O device drivers 370 may include various routines accessed through the OS 360 by the applications 340 to communicate with devices, and certain memory components. The applications 340 can be stored in the memory 330 and/or in a firmware (not shown) as executable instructions, and can be executed by the processor 310. The applications 340 include various programs that implement the various features of the device 300, including a message delivery management application that applies rules to data stored in the database 350, such as message content and contextual requirements, along with data received via the I/O data ports 320, such as modified message content and contextual requirements and context data, to control delivery of messages such that messages are made available to recipients only when contextual requirements are met and such that the content of a message may be modified based on the context of the sender/recipient (or the sender/recipient device). The database 350 represents the static and dynamic data used by the applications 340, the OS 460, the I/O device drivers 370 and other software programs that may reside in the memory. The database 350 may include, for example, stored message content, contextual requirements, and context data of the sender device 110 and/or the recipient devices 140A and 140B.

While the memory 330 is illustrated as residing proximate the processor 310, it should be understood that at least a portion of the memory 330 can be a remotely accessed storage system, for example, a server on the network 120 or another network, a remote hard disk drive, a removable storage medium, combinations thereof, and the like. Thus, any of the data, applications, and/or software described above can be stored within the memory 330 and/or accessed via network connections to other data processing systems (not shown) that may include a local area network (LAN), a metropolitan area network (MAN), or a wide area network (WAN), for example.

According to exemplary embodiments, as described above, a sender may control when a message is made available to a sender based on contextual requirements of an intended recipient (or an intended recipient device) being met. Examples of various processes for delivering context-dependent messages are provided with reference to FIGS. 4-7.

FIGS. 4-7 are flow charts illustrating methods for managing message delivery according to exemplary embodiments. It should be understood that the steps or other interactions of the illustrated methods are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the methods can be ended at any time. In certain embodiments, some or all steps of the methods, and/or substantially equivalent steps, can be performed by execution of computer-executable instructions stored or included on a non-transitory computer-readable storage device.

Figure 4:
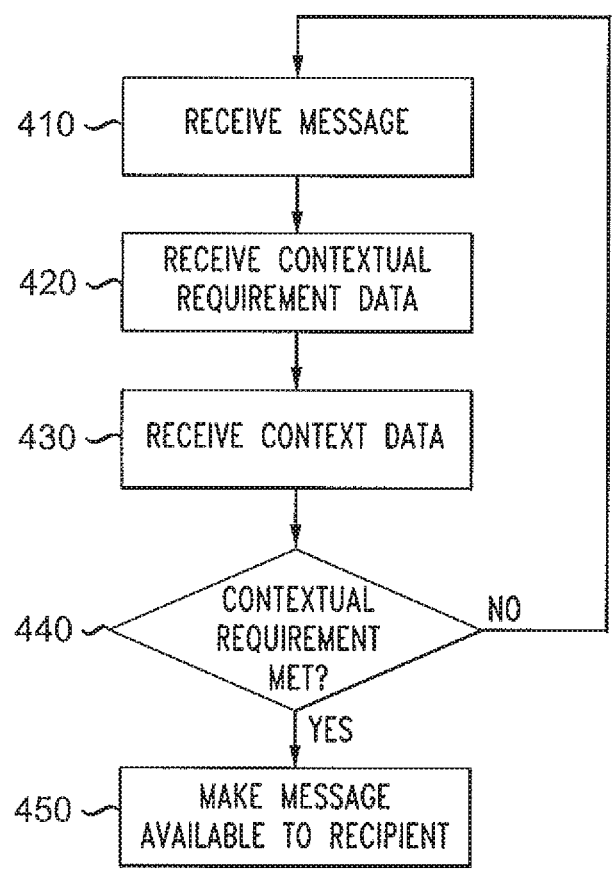
FIGS. 4-7 are flow charts illustrating methods for managing delivery of one or more messages to one or more recipients according to exemplary embodiments.
Figure 7:
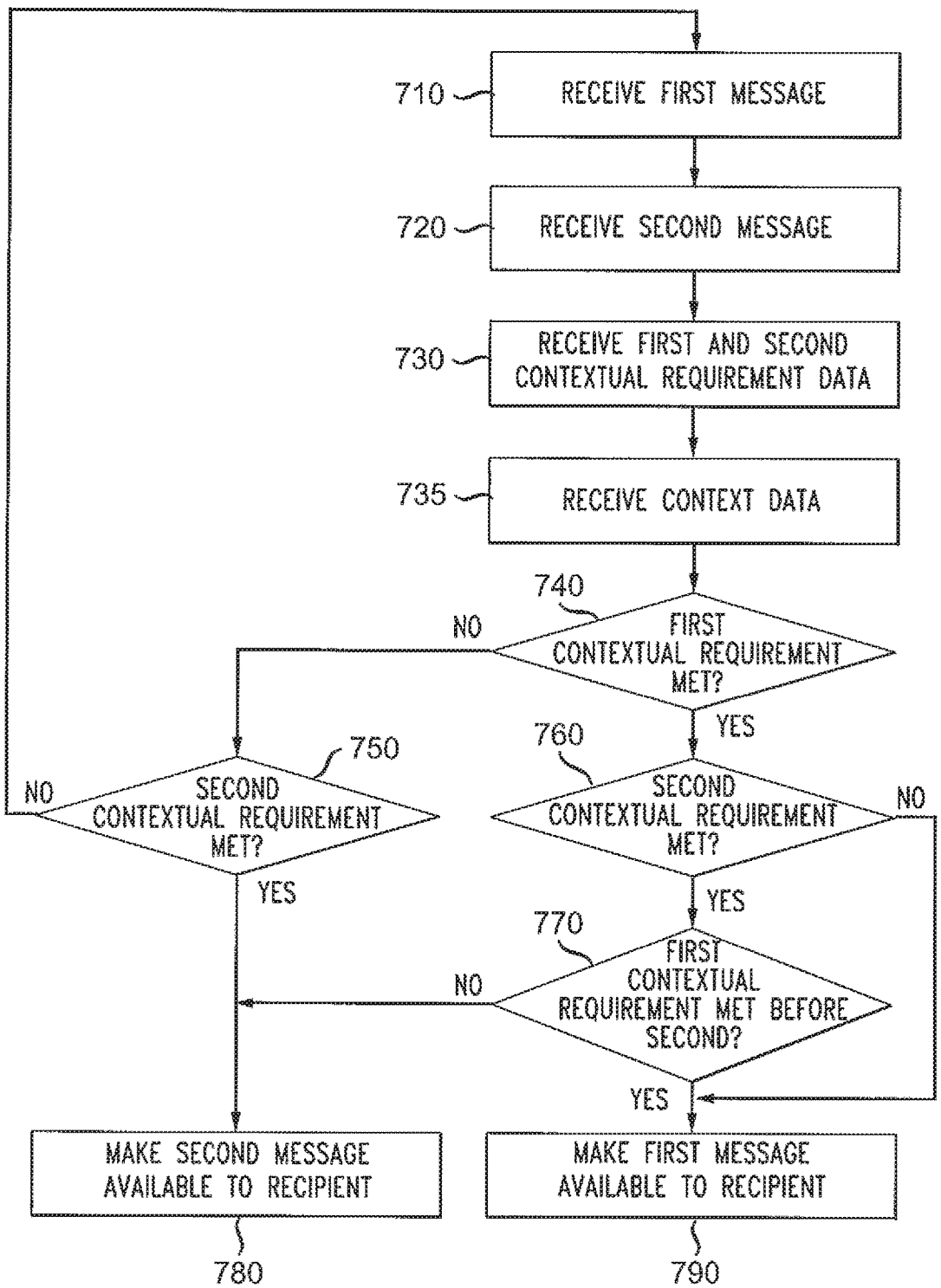

In each of FIGS. 4 and 7, the various steps may be performed entirely by the sender device 110, the message delivery management device 130, or the recipient device 140A and 140B. Alternatively, the steps may be performed by a combination of the sender device 110, the message delivery management server 130, and/or the recipient device 140A, 140B. In the descriptions that follow, the sender device 110, the message delivery management server 130, and the recipients devices 140A, 140B may be referred to generally as "the entity" performing a step. However it should be appreciated that in such cases, "the entity" may represent the sender device 110, the message delivery management server 130, the recipient devices 140A, 140B, or any combination thereof.

FIG. 4 depicts a simple process for managing context-dependent delivery of a message from a sender to a recipient according to an exemplary embodiment. The method beings at step 410 at which the message from the sender is received. The message may be stored at the sender device 110, sent to the message delivery management server 130 for storage, or sent to the recipient device 140A, 140B for storage. At step 420, contextual requirement data is received from the sender. The contextual requirement data may be stored at the sender device 110, sent to the message delivery management system 130 for storage, or sent to the recipient device, e.g., device 140A, for storage. At step 430, context data of the recipient/recipient device is received, e.g., from the recipient device 140A and/or sensors or mechanism external to the recipient device 140A. Context data of the sender/sender device 110 may be similarly received. Depending on the entity that evaluates the context data of the recipient/recipient device to determine whether the contextual requirement is met, the context data may be received by the recipient device 140A and/or communicated to the message delivery management server 130 and/or the sender device 110 via the network 120. At step 440, the context data of the recipient (including, e.g., context data of the recipient device 140A and/or a user of the recipient device 140A) is evaluated to determine whether the contextual requirement is met. If the contextual requirement is met, the message is made available to a user of the recipient device 140A at step 450. If, for example, the message is stored on the recipient device, a notification may be provided visually, audibly, or tactilely to the recipient indicating that the message is available to read. If the message is stored on the message delivery management server 130 or at the sender device 110, the message may be sent to the recipient device 140A via the network 120, and the message may be displayed on the recipient device 140A (with or without a notification).

If, at step 440, it is determined that the contextual requirement for making the message available to the user of the recipient device is not met, the process may return to step 410, allowing the message content and the contextual requirement data to be modified by, e.g., the sender using the sender device 110, until the contextual requirement is met. Also, the message content may be modified by the message management delivery server 130 and/or the recipient device, until the contextual requirements are met.

According to additional embodiments, in addition to the context-dependent messaging described above with reference to FIG. 4, multi-part, dependent, and synchronized messages are also allowed for.

For example, according to one aspect, a sender of a message is allowed to make message delivery/reading part of the contextual requirement for a different message. As an illustrative example, consider a sender sending two messages (message x and message y) to a recipient. The sender may provide a contextual requirement for message y indicating that message x must first be made available to the recipient before message y can be delivered. As a slightly more complicated example, consider a sender sending message x to recipient A and message y to recipient B, with the sender providing the contextual requirement that message x must be made available to recipient A before message y is made available to recipient B. In this situation, recipient A may not have any direct contact with recipient B, and any change in recipient A's context, e.g., recipient A reading message x, may not change recipient B's perceived context. However, it may be necessary from the sender's perspective that message x is made available to recipient A before message y is made available to recipient B. A process for controlling message delivery in this manner is explained in further detail with reference to FIG. 5.

Figure 5:
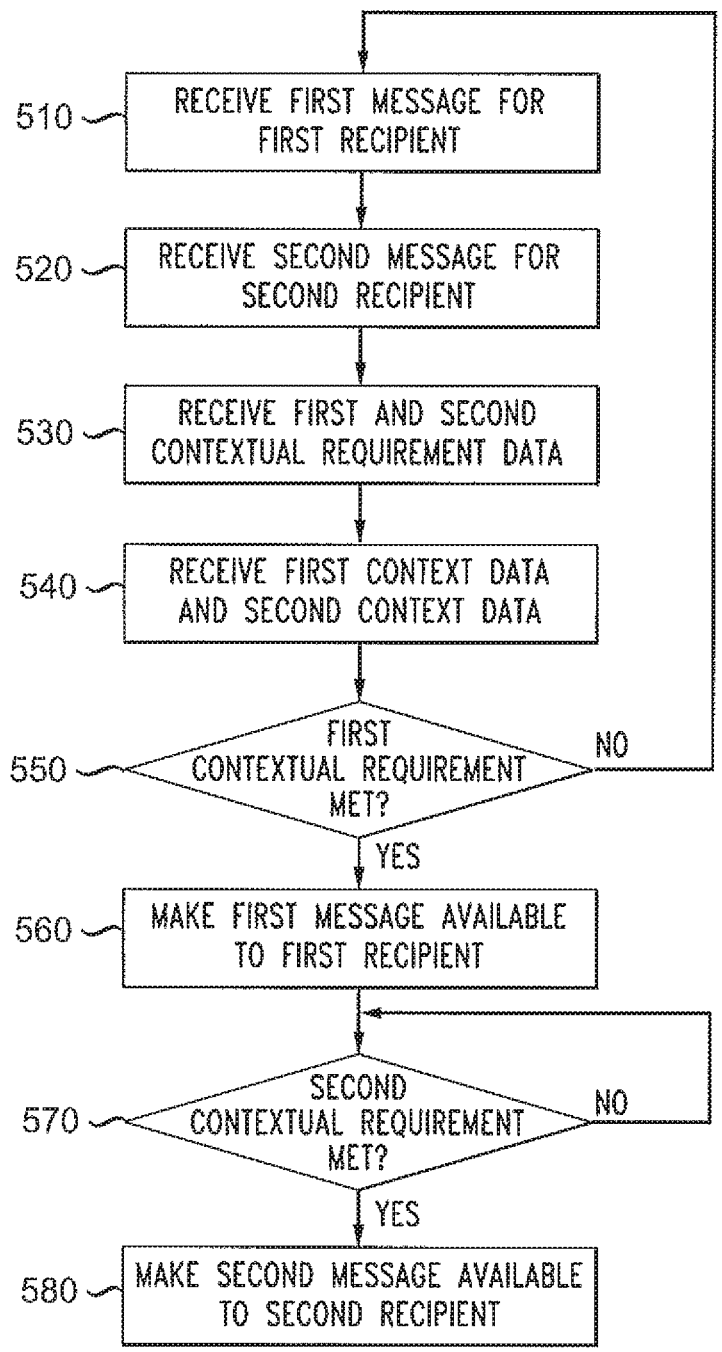

FIG. 5 illustrates a method for controlling delivery of multiple messages to multiple recipients in a particular order according to an exemplary embodiment. In the method shown in FIG. 5, a first message is intended to be made available to a first recipient before a second message is made available to a second recipient. The method begins at step 510 at which a first message intended for the first recipient is received by the sender device 110, the message delivery management server 130 or the recipient devise 140A, 140B.

At step 520, the second message intended for the second recipient is received by the sender device 110, the message delivery management server 130 or the recipient devise 140A, 140B. At step 530, first contextual requirement data (associated with a first recipient device, e.g., recipient device 140A) and second contextual requirement data (associated with a second recipient device, e.g., recipient device 140B) are received from the sender by the sender device 110, the message delivery management server 130 or the recipient devices 140A, 140B.

At step 540, the first context data and the second context data are received, e.g., from the first and second recipient devices 140A and 140B, respectively (and/or from external sensors or external sources of context data). Similarly, context data of the sender device 110 may be received.

At step 550, a determination is made by the entity evaluating the contextual requirement (e.g., the sender device 110, the message delivery management server 130 or the recipient devices 140A, 140B) whether the first contextual requirement is met. If the first contextual requirement is not met, the method returns to step 510, and the message content and contextual requirements continue to be modifiable by the sender. If, at step 550, it is determined that the first contextual requirement is met, the method proceeds to step 560, at which the first message is made available to the first recipient, e.g., a user of the recipient device 140A. At step 570, a determination is made by the entity evaluating contextual requirements (e.g., the sender device 110, the message delivery management server 130 or the recipient devices 140A, 140B) whether the second contextual requirement is met. If not, the method returns to step 570, and the evaluation continues to be performed until the second contextual requirement is met. Once the second contextual requirement is met, the method proceeds to step 580 at which the second message is made available to the second recipient, e.g., a user of the recipient device 140B.

According to another aspect, another example of dependent messaging is synchronized delivery messaging. According to this aspect, a sender sends message x to recipients A and B and provides, as part of the contextual requirements, the additional requirement that both recipients A and B must satisfy the contextual requirements in order for either of them to receive the message. This type of messaging may be very valuable for announcements to large groups of people, e.g., announcements of a significant life event, such as marriage, proposal, or the birth of a child, so that no member of the group feels left out because they did not receive the announcement first. An example of a process for controlling message delivery in this manner is explained in further detail with reference to FIG. 6.

Figure 6:
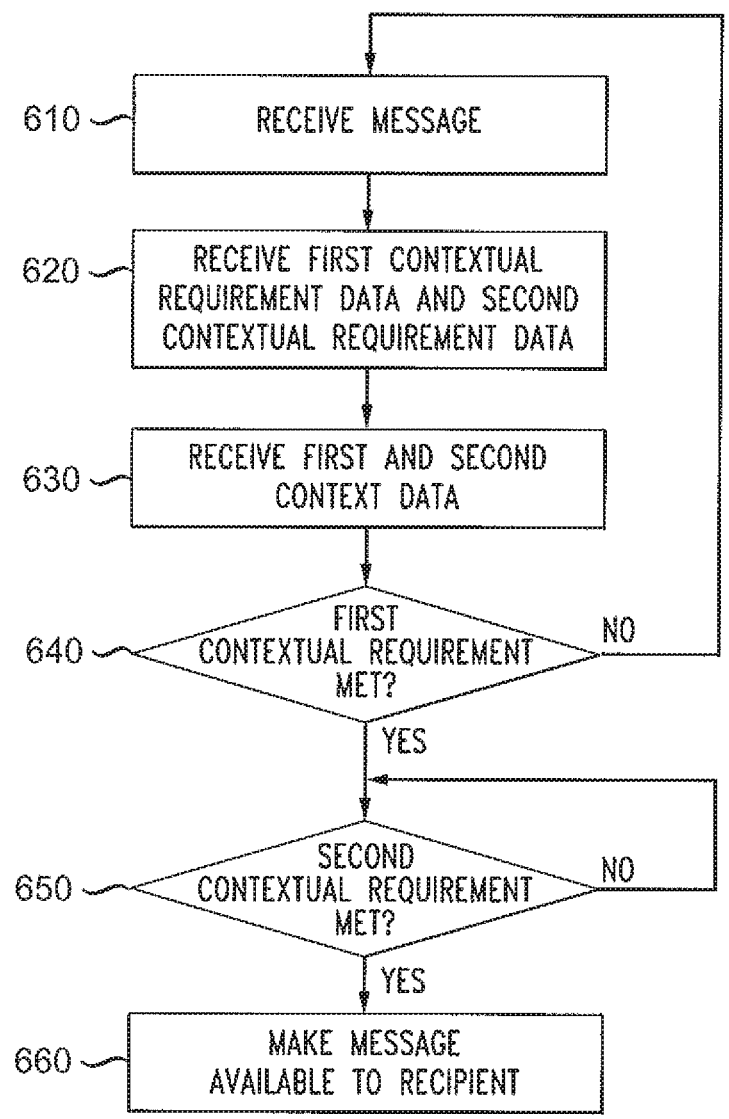

FIG. 6 illustrates a method for synchronizing control of message delivery such that a message intended for multiple recipients is made available to the recipients at the same time. The process begins at step 610 at which a message is received. The message, which is initiated by a sender, may be received by the sender device 110, the message delivery management server 130 or the recipient devices 140A, 140B. At step 620, first contextual requirement data (associated with a first recipient device, e.g., recipient device 140A) and second contextual requirement data associated with a second recipient device, e.g., recipient device 140B) are received from the sender. The contextual requirement data may be received by the sender device 110, the message delivery management server 130 or the recipient devices 140A, 140B. At step 630, first context data of the first recipient, e.g., recipient device 140A (and/or a user of the recipient device 140A) and second context data of the second recipient, e.g., recipient device 140B (and/or a user of the recipient device 140B) are received. Context data of the sender/sender device may also be received. At step 640, a determination is made by the entity evaluating the context data (e.g., the sender device 110, the message delivery management server 130 or the recipient devices 140A, 140B) whether the first contextual requirement is met. If the first contextual requirement is not met, the process returns to step 610. If the first contextual requirement is met, the process proceeds to step 650 at which a determination is made, e.g., by the sender device 110, the message delivery management server 130 or the recipient devices 140A, 140B, whether the second contextual requirement is met. If the second contextual requirement is not met, the method returns to step 650, and the evaluation continues until the second contextual requirement is met. Once the second contextual requirement is met, the process proceeds to step 660 at which the message is made available to users of the first and second recipient devices 140A and 140B, respectively.

According to another aspect, yet another type of dependent messaging may be one in which a sender sends message x and message y to a recipient providing, as part of the contextual requirement, that the recipient only be provided access to one of the messages. If the context of the recipient/recipient device satisfies the requirements for message x first, then message x is made available to the recipient, and message y may be deleted. Otherwise, if the context of the recipient/recipient device satisfies the requirement for message first, then message y is made available to the recipient, and the message x may be deleted. This is explained in further detail with reference to FIG. 7.

FIG. 7 illustrates a method for controlling message delivery in which one of multiple messages is made available to a recipient, depending on which contextual requirements are met. The method begins at step 710 at which a first message is received from a sender. At step 720, a second message is received from the sender. The messages may be received by the sender device 110, the message delivery management server 130 or the recipient devices 140A, 140B. At step 730, first contextual requirement data and second contextual requirement data are received, e.g., the sender device 110, the message delivery management server 130 or the recipient devices 140A, 140B. The first and second contextual requirement data may be associated with the same recipient device(s). At step 735, context data of a recipient/recipient device is received, e.g., by the sender device 110, the message delivery management server 130 or the recipient devices 140A, 140B. Context data of the sender/sender device may also be received. At step 740, a determination is made by the entity evaluating the contextual requirement data (e.g., the sender device 110, the message delivery management server 130 or the recipient devices 140A, 140B) whether the first contextual requirement is met. If the first contextual requirement is not met, a determination is made at step 750 whether the second contextual requirement is met. If the second contextual requirement is not met, the method returns to step 710, and the first and second messages and first and second contextual requirement data may continue to be modified by the sender. If the second contextual requirement is met, the second message is made available to the recipient, e.g., a user of the recipient device 140A or 140B, at step 780.

If, at step 740, it is determined that the first contextual requirement is met, at step 760 a determination is made by the entity performing evaluation of contextual requirements whether the second contextual requirement is met. If the second contextual requirement is not met, the first message is made available to the recipient, e.g., a user of the recipient device 140A or 140B, at step 790.

If, at step 760, it is determined that the second contextual requirement is met, at step 770 a determination is made by the entity performing evaluation of contextual requirements whether the first contextual requirement was met before the second contextual requirement. If the first contextual requirement was met first, the first message is made available to the recipient, e.g., a user of the recipient device 140A or 140B, at step 790. If the first contextual requirement was not met before the second contextual requirement, the second message is made available to the recipient, e.g., a user of the recipient device 140A or 140B, at step 780.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

The invention claimed is:

1. A method for managing message delivery, comprising:
receiving a message from a sender device, the message containing dynamic content and destined for at least a first recipient device and a second recipient device;
receiving first contextual requirement data from the sender device indicating a first dynamic contextual requirement to be met for the message to be made available to a user of the first recipient device;
receiving second contextual requirement data from the sender device indicating a second dynamic contextual requirement to be met for the message to be made available to a user of the second recipient device;
receiving first context data indicating a first context of the user of the first recipient device, wherein the dynamic content and the first dynamic contextual requirement are modifiable, depending on the first context data;
receiving second context data indicating a second context of the user of the second recipient device, wherein the dynamic content and the second dynamic contextual requirement are modifiable, depending on the second context data;
evaluating, by a processor, the first context data and the second context data to determine whether the first dynamic contextual requirement and the second dynamic contextual requirement are met, wherein the dynamic content and the first dynamic contextual requirement are modifiable until the processor determines that the first dynamic contextual requirement is met; and
responsive to the first dynamic contextual requirement and the second dynamic contextual requirement being met, making the message available to the user of the first recipient device and the user of the second recipient device.

2. The method of claim 1, wherein the message is received by any of: by a sender device, a message delivery management server, the first recipient device, or the second recipient device.

3. The method of claim 1, wherein the processor is in the sender device.

4. The method of claim 1, wherein the processor is in a server that is part of a network connecting the sender device and the first recipient device and the second recipient device.

5. The method of claim 1 further comprising storing the message outside the first recipient device or the second recipient device until a respective one of the first and second dynamic contextual requirements are met.

6. The method of claim 1, wherein the dynamic content and the second dynamic contextual requirement are modifiable until the processor determines that the second dynamic contextual requirement is met.

7. A method for managing message delivery, comprising:
receiving a first message from a first sender device, the first message containing first dynamic content and destined for a first recipient device;
receiving a second message from a second sender device, the second message containing second dynamic content and destined for a second recipient device;
receiving first contextual requirement data from the first sender device indicating a first dynamic contextual requirement to be met for the first message to be made available to a user of the first recipient device;
receiving second contextual requirement data from the second sender device indicating a second dynamic contextual requirement to be met for the second message to be made available to a user of a second recipient device;
receiving first context data indicating a first context of the user of the first recipient device, wherein the first dynamic content and the first dynamic contextual requirement are modifiable, depending on the first context data;
receiving second context data indicating a second context of the user of the second recipient device, wherein the second dynamic content and the second dynamic contextual requirement are modifiable, depending on the second context data;
evaluating, by a processor, the first context data to determine whether the first dynamic contextual requirement is met, wherein the first dynamic content and the first dynamic contextual requirement are modifiable until the processor determines that the first dynamic contextual requirement is met; and
responsive to the first dynamic contextual requirement being met, making the first message available to the user of the first recipient device; and
when the first message has been made available to the user of the first recipient device, evaluating, by the processor, the second context data to determine whether the second dynamic contextual requirement is met; and
responsive to the second dynamic contextual requirement being met, making the second message available to the user of the second recipient device.

8. The method of claim 7, wherein the first message or the second message is received by any of: by a sender device, a message delivery management server, the first recipient device, or the second recipient device.

9. The method of claim 7, wherein the processor is in the first sender device or the second sender device.

10. The method of claim 7, wherein the processor is in a server that is part of a network connecting the first sender device, the second sender device, the first recipient device and the second recipient device.

11. The method of claim 7 further comprising storing the first message or the second message outside the first or second recipient device until a respective one of the first and second dynamic contextual requirements are met.

12. The method of claim 7, wherein the second dynamic content and the second dynamic contextual requirement are modifiable until the processor determines that the second dynamic contextual requirement is met.

13. A method for managing message delivery, comprising:
receiving a first message from a first sender device, the first message containing first dynamic content and destined for a first recipient device;
receiving a second message from a second sender device, the second message containing second dynamic content and destined for a second recipient device;
receiving first contextual requirement data from the first sender device indicating a first dynamic contextual requirement to be met for the first message to be made available to a user of the first recipient device;
receiving second contextual requirement data from the second sender device indicating a second dynamic contextual requirement to be met for the second message to be made available to a user of a second recipient device;
receiving first context data indicating a first context of the user of the first recipient device, wherein the first dynamic content and the first dynamic contextual requirement are modifiable, depending on the first context data;

receiving second context data indicating a second context of the user of the second recipient device, wherein the second dynamic content and the second dynamic contextual requirement are modifiable, depending on the second context data;

evaluating, by a processor, the first context data to determine whether the first dynamic contextual requirement is met;

evaluating, by the processor, the second context data to determine whether the second dynamic contextual requirement is met;

storing the first message outside the first recipient device or the second recipient device until a respective one of the first and second dynamic contextual requirements are met; and responsive to only the first dynamic contextual requirement being met, making the first message available to the user of the first recipient device; and responsive to only the second dynamic contextual requirement being met, making the second message available to the user of the second recipient device; and responsive to the first dynamic contextual requirement being met before the second dynamic contextual requirement being met, making the first message available to the user of the first recipient device; and responsive to the second dynamic contextual requirement being met before the first dynamic contextual requirement being met, making the second message available to the user of the second recipient device.

14. The method of claim 13, wherein the first message or the second message is received by any of: by a sender device, a message delivery management server, the first recipient device, or the second recipient device.

15. The method of claim 13, wherein the processor is in the first sender device or the second sender device.

16. The method of claim 13, wherein the processor is in a server that is part of a network connecting the first sender device, the second sender device, the first recipient device and the second recipient device.

17. The method of claim 13, wherein the first dynamic content, the second dynamic content, the first dynamic contextual requirements, and the second dynamic contextual requirements are modifiable until the processor determines that the first dynamic contextual requirement and the second dynamic contextual requirement is met.

* * * * *